UNITED STATES PATENT OFFICE.

JOHN W. KIDWELL, OF WASHINGTON, DISTRICT OF COLUMBIA.

MANUFACTURE OF PIGMENT OR PAINT.

SPECIFICATION forming part of Letters Patent No. 503,424, dated August 15, 1893.

Application filed October 18, 1892. Serial No. 449,247. (No specimens.)

*To all whom it may concern:*

Be it known that I, JOHN W. KIDWELL, of Washington, in the District of Columbia, have invented a new and useful Improvement in the Manufacture of Pigment or Paint, which is fully set forth in the following specification.

This invention has reference to the manufacture of a pigment or paint-stock, and consists generically in the utilization for this purpose of mineral compounds of titanium.

The invention is based upon the discovery that paints composed of or containing these compounds, or some of them, possess peculiar and useful properties for many purposes, as hereinafter indicated.

The invention furthermore affords the means of utilizing certain titanic minerals found in nature, and which at present are of no commercial value, it being well known that the metal titanium and its compounds are of little or no use industrially.

The titanic compounds to which this invention particularly relates, are known as menaccanite, rutile, anatase and brookite, and are found in the phosphate ores of Nelson county, Virginia, in a proportion aggregating about seventy to seventy-five per cent. of the ore. These ores are treated by dry concentration to obtain the phosphate (apatite), the residuum, after removal of the phosphate, being at present a waste product, composed mostly of menaccanite, mixed with small proportions of the other titanic compounds mentioned above, and sometimes with a little mica. The presence of the latter is for some purposes advantageous, and for nearly all purposes unobjectionable, and therefore may be disregarded. This mineral I crush to an impalpable powder, in which condition it becomes a commercial article ready for sale and use as a paint stock, or base for making liquid paints by solution in oils, turpentine, &c., with or without admixture with other substances commonly employed in this art. The powder varies in color from deep black to a dark reddish tint, according to the proportions of rutile that may be present. When composed entirely of or largely of menaccanite, the color is deep black. Preferably, and in order to obtain a higher grade article, I treat the powder with muriatic acid, for the purpose of eliminating traces of phosphate of lime or other impurities which it may contain.

The mineral paint, when mixed with a suitable liquid medium, may be usefully applied as a coating for various purposes where a non-corrosive, water-repellent, fire-proof, or insulated surface is a desideratum. For such purposes a mixture of the specified minerals, or some of them, with hydro carbons, oxygenated or non-oxygenated, and particularly asphalts of every sort, paraffine, oils, pitch, and coal tar, yields peculiarly good results. The action of the resulting mixture is such as to indicate a chemical combination. For example, a mixture containing the specified minerals with asphaltum is not affected by the strongest acids, and resists a much higher temperature than would cause the asphaltum alone to run and spread.

Among the useful applications of this compound as a paint or coating may be mentioned the protection of boilers and metal work generally, coating ship-bottoms, wood-work, leather, &c. As a coating for textiles it imparts water-proof and indestructible properties, without impairing materially the pliability of the fabric. It is also useful as an insulating medium, having high electrical resistance, combined with the property of withstanding heat and the corrosive action of air and water. By reason of these properties it is particularly applicable to the coating of submarine or subterraneous electric cables.

Other industrial applications of the invention might be mentioned; but the uses to which it is applicable will be sufficiently understood from the explanation given above.

I am aware that it has been proposed heretofore to manufacture an oxide pigment from titanium sands, by treatment of the same in a reverbatory furnace, and with superheated steam, which operations have for their object to produce peroxide of the minerals treated. These titanium iron sands are a natural product containing a small proportion (three to ten per cent.) of titanium, the balance being chiefly silica and magnetic iron. The resulting product, when treated as above indicated is essentially different from that claimed herein. Its characteristics are chiefly those due to the iron and silica, the proportion of the titanium mineral being very slight.

The mineral described above, constituting the base or paint stock, and having the peculiar properties specified, is composed almost entirely of titanic mineral. Instead of being oxidized, as proposed in the process above referred to, it is inoxidizable, which constitutes one of its chief advantages, for the purposes specified. Moreover, it does not contain magnetic iron ore, which is an essential ingredient of the paint made by the old process referred to. On the contrary, if the mineral treated according to my invention contains any magnetic ore, the latter must be removed by magnetic separation in order to obtain the best results.

In my concurrent application of even date herewith (Serial No. 449,248) I have described and claimed the manufacture of a plastic composition for building blocks, pavements, sewers, and similar constructive purposes, the said composition being composed of asphalt and the specified titanic minerals, combined in proportions suitable for such purposes. I do not herein claim the described composition for buildings, pavements and similar structures, reserving the same to my said application, Serial No. 449,248.

I claim as my invention or discovery—

1. The described mineral pigment or paint-stock, for painting or coating the surface of various articles, said pigment or paint-stock being an inoxidizable, mineral, in pulverulent form, composed of titanium oxides very rich in titanium, as set forth.

2. A mineral paint composed of titanic oxides such as specified mixed with asphalt, substantially as described.

3. A mineral paint composed of the specified titanium ore pulverized and mixed with hydrocarbon, substantially as described.

In testimony whereof I have signed this specification in the presence of two subscribing witnesses.

JOHN W. KIDWELL.

Witnesses:
PHILIP MAURO,
REEVE LEWIS.